(12) United States Patent
Irinouchi et al.

(10) Patent No.: US 8,988,562 B2
(45) Date of Patent: Mar. 24, 2015

(54) IMAGE PROCESSING APPARATUS AND IMAGE PROCESSING METHOD

(71) Applicant: Hitachi, Ltd., Tokyo (JP)

(72) Inventors: Akira Irinouchi, Hitachinaka (JP); Makoto Asuka, Mito (JP)

(73) Assignee: Hitachi Industry & Control Solutions, Ltd., Ibaraki (JP)

( * ) Notice: Subject to any disclaimer, the term of this patent is extended or adjusted under 35 U.S.C. 154(b) by 0 days.

(21) Appl. No.: 13/683,207

(22) Filed: Nov. 21, 2012

(65) Prior Publication Data

US 2013/0135501 A1    May 30, 2013

(30) Foreign Application Priority Data

Nov. 25, 2011    (JP) .................................. 2011-256898

(51) Int. Cl.
*H04N 9/64* (2006.01)
*H04N 5/367* (2011.01)
*H04N 5/357* (2011.01)

(52) U.S. Cl.
CPC ............. *H04N 5/367* (2013.01); *H04N 5/3572* (2013.01)
USPC ......................................................... 348/246

(58) Field of Classification Search
CPC .... H04N 5/2572; H04N 5/367; H04N 5/3675
USPC ......................................................... 348/246
See application file for complete search history.

(56) References Cited

U.S. PATENT DOCUMENTS

| 2003/0146975 | A1* | 8/2003 | Joung et al. | 348/164 |
| 2005/0206614 | A1* | 9/2005 | Brosnan et al. | 345/156 |
| 2006/0007331 | A1* | 1/2006 | Izumi et al. | 348/246 |
| 2006/0197854 | A1* | 9/2006 | Kubo | 348/246 |
| 2008/0246725 | A1* | 10/2008 | Brosnan et al. | 345/157 |
| 2011/0080505 | A1* | 4/2011 | Ogino | 348/246 |

FOREIGN PATENT DOCUMENTS

| JP | 09-247548 A | 9/1997 |
| JP | 2002-354340 | 12/2002 |
| JP | 2004-134941 | 4/2004 |
| JP | 2006-121478 | 5/2006 |
| JP | 2006-211069 | 8/2006 |

* cited by examiner

*Primary Examiner* — James Hannett
(74) *Attorney, Agent, or Firm* — Baker Botts LLP

(57) ABSTRACT

Defective pixels are to be selected so as not to cause image degradation. A defective pixel correction unit 13 in an image processing apparatus 1 obtains an imaging signal a12 from an imaging sensor 16 via a gain adjustment unit 12, and calculates an absolute value for the pixel value difference between a pixel to be tested for a defect of the imaging sensor 16 and each of its surrounding pixels, respectively. Next, the defective pixel correction unit 13 compares the differential with a defective pixel determination threshold value and determines the pixel being tested as defective, if the differential is greater than the threshold value. It should be noted that the threshold value is changed according to the magnitude of an image transition, by detecting the image transition of a video signal a14 in an image transition detection unit 15.

14 Claims, 6 Drawing Sheets

Panning direction

– 1 –

IMAGE PROCESSING APPARATUS AND IMAGE PROCESSING METHOD

TECHNICAL FIELD

The present invention relates to a technique for correcting defective pixels of a solid-state imaging sensor used in an imaging device.

BACKGROUND OF THE INVENTION

In recent years, an image processing apparatus device has been developed using a solid-state imaging sensor with a large number of pixels as an imaging element. It is possible for the solid-state imaging sensor to have defective pixels, which are caused by a manufacturing process, or after being used for a long period, or the like. Techniques to detect and correct such defective pixels have been investigated, to avoid degradation of image quality.

For example, a technique is disclosed in Japanese Laid-Open Patent Application No. H09-247548 that a defect inspection is performed, in a test for detecting a defective pixel, for a pixel to be tested, based on the magnitude of a difference in the pixel value between a pixel and each of its surrounding pixels, and the pixel value of the pixel determined defective is replaced with a pixel value of a surrounding pixel.

SUMMARY OF THE INVENTION

Description of the Related Art

However, as the defect determination is performed by comparing the magnitude of the pixel value difference between the pixel to be tested and each of its surrounding pixels, respectively, in the technique described in Japanese Laid-Open Patent Application No. H09-247548, there is a problem that the determination is performed erroneously for an object having high-frequency components (for example, a state that pixel values change finely between adjacent pixels). Further, there is another problem that once the pixel value of a defective pixel is replaced by the interpolation value of its surrounding pixels, by the erroneous determination, the high-frequency components are lost. Thus, there is a possibility that performing a determination of a defective pixel is rather leading to an unwanted correction processing to cause degradation in image quality.

Therefore, the present invention is intended to provide a technique for selecting defective pixels so as not to cause image degradation.

Solution for Problems

In order to solve the aforementioned problems, an image processing apparatus according to the present invention includes: an imaging unit having an imaging sensor that outputs an electrical signal by photoelectrically converting incident light from an object; and an image transition detection unit that changes a correction criterion for detecting defective pixels on the imaging sensor, according to the magnitude of a transition of an image obtained through the imaging unit.

Effects of the Invention

According to the present invention, defective pixels are selected so as not to cause image degradation.

BRIEF DESCRIPTION OF THE DRAWINGS

FIG. 3A and FIG. 3B are for a case when the magnitude of an image transition is small and FIG. 3C and FIG. 3D for a case when the magnitude of an image transition is large.

FIG. 8A shows how the photographing is performed, FIG. 8B and FIG. 8C are for a case without an afterimage, whereas FIG. 8D and FIG. 8E are for a case with an afterimage.

EMBODIMENTS OF THE INVENTION

Next, embodiments for implementing the present invention (hereinafter referred to as "the present embodiment") will be described in detail with reference to the accompanying drawings.

(Overview)

To begin with, an overview of the present embodiment will be described. Defective pixels of an imaging sensor are barely noticeable, for example, when photographing stars in the night sky, by fixing an image processing apparatus to a tripod or the like. This is because the movement of the stars in the image is much slower as if they almost remain still, even though scratches due to defective pixels are projected at fixed positions on the screen. However, defective pixels become noticeable when photographing stars in the night sky, while panning, because they appear to be in motion relative to the stars if scratches are projected at fixed positions on the screen.

Therefore, a model is to be developed such that the likelihood for detecting defective pixels is configured to vary according to the magnitude of an image transition representing the movement of an image, and the model will be described below with reference to FIG. 2 and FIG. 3A-FIG. 3D. Here, the image transition is not only the transition representing the movement of the image caused by panning, tilting, zooming or focusing operation of the image processing apparatus, for example, but also the movement of the image caused by motion of the object being photographed.

Figure 2:
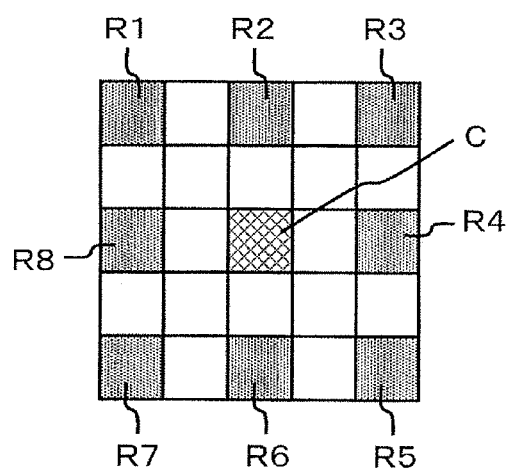
FIG. 2 is a diagram to show a positional relationship of the central pixel with reference pixels used for determining a defective pixel.

FIG. 2 is a diagram to show a positional relationship between a central pixel C and reference pixels R used for determining a defective pixel. The central pixel C is a pixel to be tested on whether or not it is a defective pixel. In FIG. 2, square lattices show a pixel array of an imaging sensor 16. The square lattices are usually composed of an array of 2 by 2 pixels, each of pixels having a different color filter thereon, and an identical color filter is arranged on every other pixel both in horizontal and vertical directions. For example, the pixel value of the central pixel C, to be tested, is compared with the pixel values of 8 surrounding pixels having the same color filter in FIG. 2, or reference pixels R (R1, R2, R3, R4, R5, R6, R7 and R8), for determining whether or not the central pixel C is a defective pixel. In other words, the absolute value for the pixel value difference between the central pixel C and each of the reference pixels R (R1, R2, R3, R4, R5, R6, R7 and R8) is calculated, respectively, for determining whether or not the absolute value for the pixel value difference is greater than a predetermined threshold value (described later as a defective pixel determination threshold value). Note that a pixel other than the central pixel C can be used, as the reference pixels R are not limited to the position shown in FIG. 2.

Figure 3A:
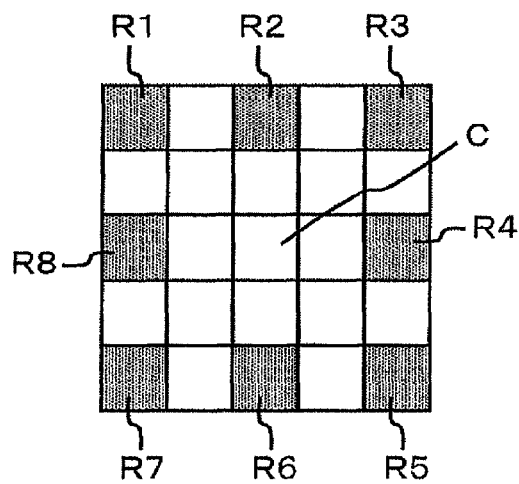
FIG. 3A through FIG. 3D show examples of a defective pixel detection process, where
Figure 3B:
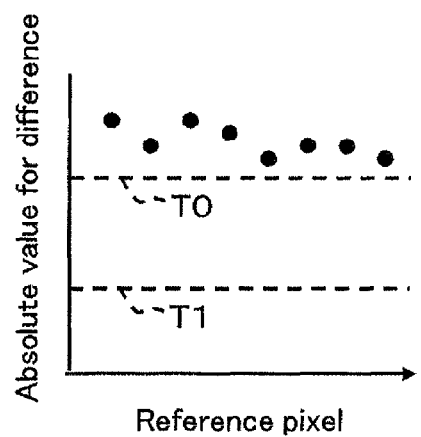

FIG. 3A and FIG. 3B show an example of a defective pixel detection process, when the magnitude of an image transition is relatively small. Here, FIG. 3B is a graph in which the absolute values for the pixel value difference between the central pixel C and each of the reference pixels R are plotted for the pixels in FIG. 3A. Broken lines represent defective pixel determination threshold values T (T0, T1) that are used when determining whether or not to be a defective pixel. Here, the defective pixel determination threshold value T0 is used when the magnitude of the image transition is small, whereas the defective pixel determination threshold value T1 is used when the magnitude of the image transition is large, and T0 is larger than T1. Note that, in the present embodiment, it will be described hereinafter that the central pixel C is determined to be defective, as shown in FIG. 3B, when the absolute value for the pixel value difference is greater than the defective pixel determination threshold value T for all of the eight reference pixels. However, the determination criterion may be set to "equal to or more than N (1≤N≤7)", instead of "all of the eight".

Figure 3C:
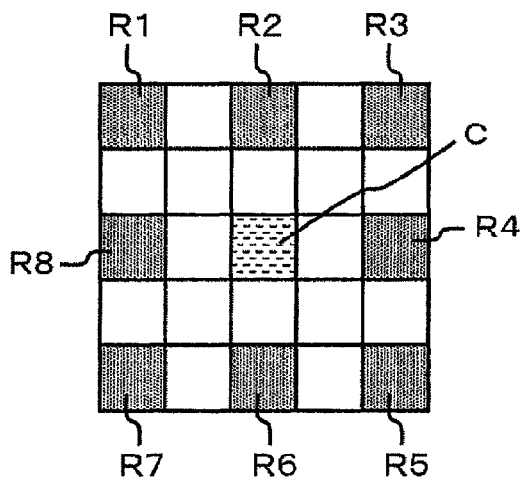
Figure 3D:
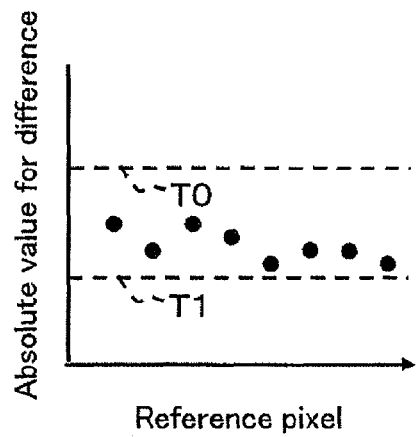

FIG. 3C and FIG. 3D are for a case when the magnitude of image transition is relatively large. Here, FIG. 3D is a graph in which the absolute values for the pixel value difference between the central pixel C and each of the reference pixels R are plotted for the pixels in FIG. 3C. Plotted values in FIG. 3D are smaller than those in FIG. 3B. However, as the defective pixel determination threshold T1 becomes the determination criterion when the magnitude of an image transition is large, the absolute value for the pixel value difference is determined to be larger than the defective pixel determination threshold value T1 for all of the eight reference pixels R, as seen in FIG. 3D, and the central pixel C is determined to be defective. As such, defective pixels become more likely to be detected when the magnitude of an image transition is large, by decreasing the defective pixel determination threshold value T, compared to a case when the magnitude of an image transition is small. In this way, when the magnitude of an image transition is large, it is possible to detect defective pixels more likely even if the absolute value for the pixel value difference is small.

(Image Processing Apparatus)

An exemplary configuration of an image processing apparatus in the present embodiment will be described with reference to FIG. 1.

An image processing apparatus 1 includes an imaging unit 11, a gain adjustment unit 12, a defective pixel correction unit 13, an image signal processing unit 14 and an image transition detection unit 15, at least.

The imaging unit 11 is composed of a lens group including a zoom lens and a focus lens, and an imaging sensor 16 such as a CCD (Charge Coupled Device), CMOS (Complementary Metal Oxide Semiconductor) or the like. The imaging sensor 16 receives incident light from an object, via a lens (not shown), converts the received light photoelectrically into an electric signal, and outputs an image signal a11.

The gain adjustment unit 12 includes a CDS (Correlated Double Sampling), an AGC (Automatic Gain Control), and an AD (Analog to Digital) converter. The gain adjustment unit 12 controls the magnitude of a11, the image signal outputted from the imaging unit 11, and outputs an imaging signal a12.

The defective pixel correction unit 13 has a function of correcting defective pixels occurring in the image sensor 16, and outputs an image correction signal a13. The defective pixel correction unit 13 first calculates the absolute value for the pixel value difference between a pixel to be tested and each of the reference pixels other than the pixel to be tested, in order to determine whether or not to be defective, then determines a pixel to be tested as defective when the absolute value for the pixel value difference is greater than the correction criterion, by comparing thereto. Here, the correction criterion is to determine whether or not the correction is to be executed. For example, the defective pixel determination threshold T is used to detect defective pixels. The defective pixel determination threshold T is obtained from the image transition detection unit 15. Then, the defective pixel correction unit 13 corrects the pixel value of a defective pixel to the pixel value of the reference pixel. The details of the function of the defective pixel correction unit 13 will be described later.

The image signal processing unit 14 has a function of performing predetermined processing on the image correction signal a13, then generates and outputs a video signal a14. Here, the predetermined processing means image signal processing, such as noise removal, gamma correction, edge enhancement, filtering, zooming, camera shake correction, and image recognition, as well as output interface processing to convert to signal formats for input devices, such as a TV or a storage device. Further, the output interface processing includes converting to predetermined signals for network transmission, such as video output signals in NTSC (National Television System Committee) or PAL (Phase Alternating Line) format and a HDMI (High-Definition Multimedia Interface: registered trademark) signal.

The image transition detection unit 15 has a function of detecting an image transition in the video signal a14. The image transition detection unit 15 detects an image transition, for example, as a motion vector. Then, the image transition detection unit 15 changes a correction criterion used for detecting defective pixels, depending on the magnitude of a motion vector (magnitude of an image transition), and determines whether or not to correct.

The necessity of correction is determined, for example, by detecting defective pixels using the defective pixel determination threshold value T. The defective pixel determination threshold value T is outputted to the defective pixel correction unit 13 as a threshold value signal a15. It should be noted that an afterimage, to be described later, may also be considered when calculating the magnitude of the image transition. In addition, the image transition detection unit 15 will be described later in detail.

It should be noted that all of the imaging unit 11, the gain adjustment unit 12, the defective pixel correction unit 13, the image signal processing unit 14 and the image transition detection unit 15 may be configured in circuitries (hardware), or processing functions for the defective pixel correction unit 13, the image signal processing unit 14 or the image transition detection unit 15 may be realized by a computer program. Further, the image processing apparatus 1 has a function to control an exposure time of the imaging unit 11 or a signal gain of the gain adjustment unit 12, so that the exposure status becomes optimum according to a photographing scene. For example, the brightness of the output image of a video signal a14 may be set to be constant, by making the exposure time longer and the signal gain larger in a dark environment, whereas making the exposure time shorter and the signal gain smaller in a bright environment.

Figure 4:
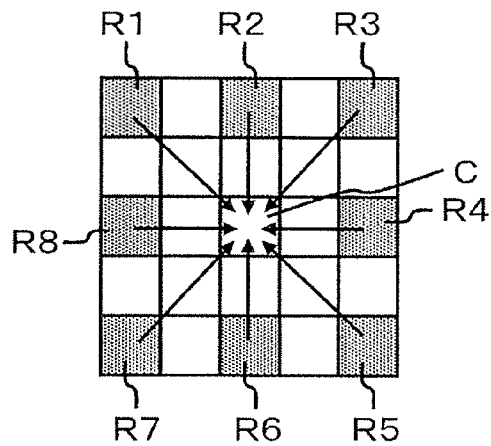
FIG. 4 shows an example of a pixel value correction process for defective pixels.

FIG. 4 is a diagram illustrating an example process in which the defective pixel correction unit 13 corrects the pixel value of a defective pixel. As shown in FIG. 4, the pixel value of the defective pixel may be replaced by the median of the pixel values of the reference pixels R, for example.

Figure 1:
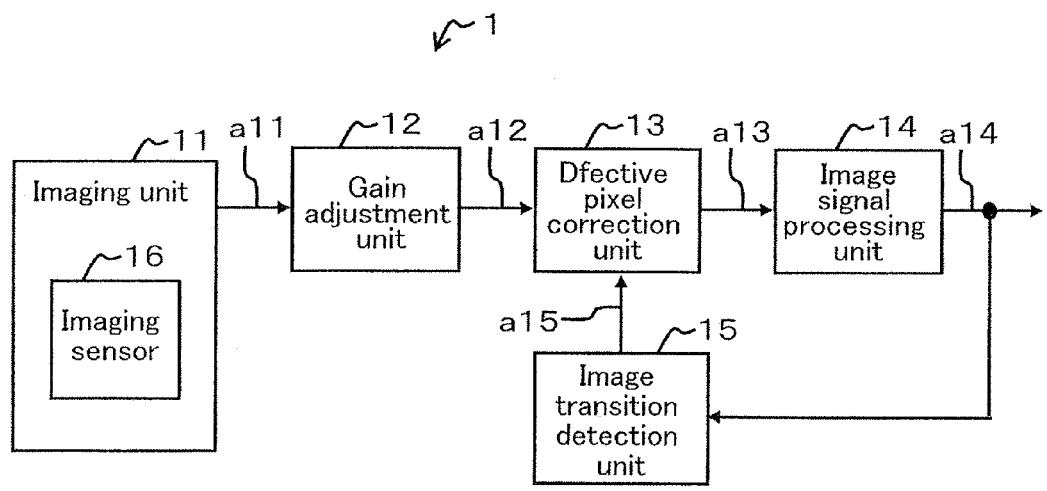
FIG. 1 is a diagram to show an exemplary configuration of an image processing apparatus in an embodiment of the present invention.
Figure 5:
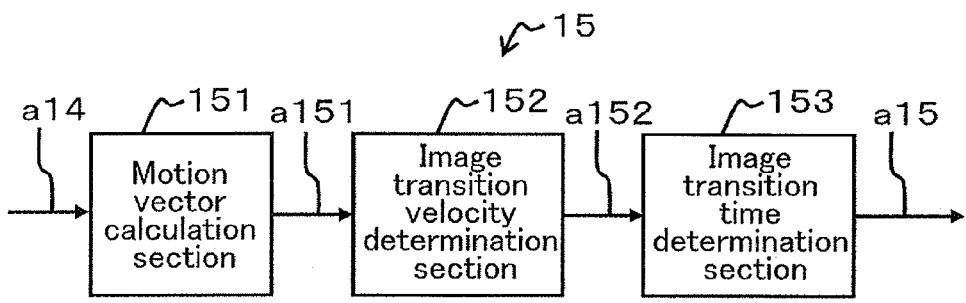
FIG. 5 depicts an example block diagram for functions within the image transition detection unit.

FIG. 5 is a block diagram for explaining an example function of the image transition detection unit 15 (refer to FIG. 1, as appropriate). The image transition detection unit 15 is composed of a motion vector calculation section 151, an image transition velocity determination section 152 and an image transition time determination section 153.

The motion vector calculation section 151 stores a video signal a14, processed by the image signal processing unit 14, to a memory (not shown), then calculates a motion vector a151, by comparing a next-inputted video signal a14 with a previously-stored video signal a14, as a reference image, for outputting to the image transition velocity determination section 152. In particular, the reference image frame previously stored is divided into small regions and the pixel value information thereof is stored in the memory, then a motion vector a151 per unit time is calculated, by detecting the position of the pixel value information of each of small regions in the next-inputted video signal a14.

The image transition velocity determination section 152 determines whether or not the magnitude of the moving vector a151 per unit time (an image transition velocity) is greater than the predetermined threshold value, and outputs the result thereof to the image transition time determination section 153, as a velocity determination threshold value signal a152.

The image transition time determination section 153 determines whether or not a duration of time (image transition time) for which the determination result stays valid, is equal to or greater than the predetermined threshold value of time, when the determination result is equal to or greater than the predetermined threshold value of velocity for the received velocity determination threshold value signal a152. Then, the image transition time determination section 153 determines that the magnitude of the image transition is large, if the duration of time is determined to be equal to or greater than the predetermined threshold value of time, whereas the magnitude of the image transition is small, if the duration of time is determined to be less than the predetermined threshold value of time. In addition, the correction criterion is changed so that defective pixels can be detected more likely in the case when the magnitude of the image transition is determined to be large, than in the case when the magnitude of the image transition is determined to be small. For example, if it is determined to use the defective pixel determination threshold value T as the correction criterion, the defective pixel determination threshold value T is decreased when the magnitude of the image transition is determined to be large. The image transition detection unit 15 outputs the defective pixel determination threshold value T to the defective pixel correction unit 13 as the threshold value signal a15.

As a method for decreasing the defective pixel determination threshold value T, two cases are possible, for example, such that (1) the defective pixel determination threshold value T is decreased accordingly, as the magnitude of the image transition becomes larger, when the magnitude of the image transition is equal to or greater than the predetermined threshold value, or (2) two values are used so that the defective pixel determination threshold value T0 is set when the magnitude of the image transition is determined to be small, whereas the defective pixel determination threshold value T1 is set when the magnitude of the image transition is determined to be large, and either case can be used.

Figure 6:
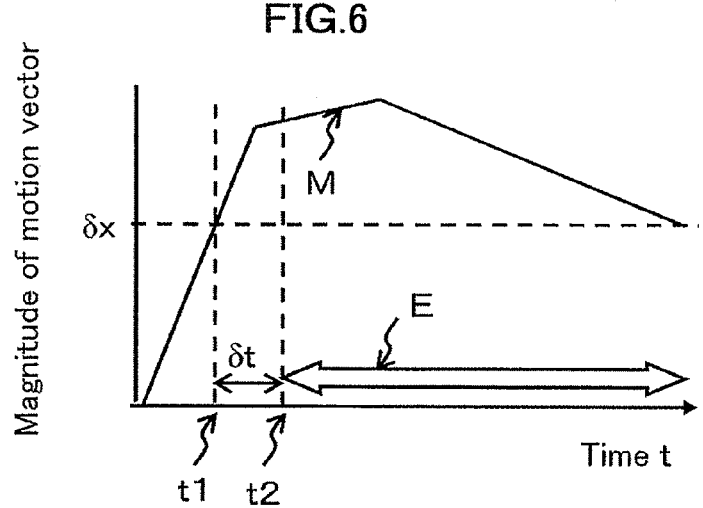
FIG. 6 depicts an example of the condition to change a threshold value for a defective pixel determination.

FIG. 6 shows an example condition to change the defective pixel determination threshold value T. In FIG. 6, the horizontal axis represents the time and the vertical axis represents the magnitude of the motion vector per unit time (the velocity of the image transition). The magnitude of the motion vector per unit time becomes 0 if there is no image transition, and the value of the vertical axis changes depending on the magnitude of the motion vector per unit time. In FIG. 6, assumed are the velocity threshold value δx and the time threshold value δt. In the image transition detection unit 15, the image transition velocity determination section 152 detects a first point t1 when the magnitude of the motion vector per unit time (the velocity of the image transition) is equal to or greater than the velocity threshold value δx. Next, the image transition time determination section 153 starts measuring time from the first point t1 for the range where the velocity is equal to or greater than the threshold value δx, and determines that the magnitude of the image transition is large, from a second point t2, where the duration of time from the point t1 thereto has passed the time threshold value δt (the range E in FIG. 6). Then, the image transition time determination section 153 sets the defective pixel determination threshold value T to be smaller than in the case when the magnitude of the image transition is small, and outputs the defective pixel determination threshold value T to the defective pixel correction unit 13, as the threshold value signal a15.

Next, an example of a processing flow will be described for setting the defective pixel determination threshold value T in the image transition detection unit 15, with reference to FIG. 7 (see FIGS. 1 and 5, as appropriate).

At step S701, the image transition time determination section 153 in the image transition detection unit 15, initializes the defective pixel determination threshold value T, when the power of the image processing apparatus 1 is turned on. More specifically, the image transition detection unit 15 reads the initial setting value of the defective pixel determination threshold value T (the defective pixel determination threshold value T0 for the case when the magnitude of the image transition is small), stored in the storage unit (not shown). Further, the image transition detection unit 15 reads the velocity threshold value δx and the time threshold value δt, stored in the storage unit (not shown).

At Step S702, the motion vector calculation section 151 calculates the motion vector a151 per unit time. In the present embodiment, the magnitude of the motion vector a151 per unit time is, as calculated for each of the small regions, represented by the average of the magnitude of the plurality of motion vectors calculated from one screen of the image or the maximum value thereof. Or, such a value calculated on the small region, that includes the position of the pixel to be tested, may be used as the magnitude of the motion vector.

At Step S703, the image transition velocity determination section 152 determines whether or not the magnitude of the motion vectors per unit time is greater than the velocity threshold value δx. If the magnitude is determined to be equal to or greater than the velocity threshold value δx (Yes at Step S703), the process proceeds to Step S704, and the process proceeds to Step S706 if it is determined to be less than the velocity threshold value δx (No at Step S703).

At Step S704, the image transition time determination section 153 determines whether or not the duration of time, while the velocity is equal to or greater than the velocity threshold value δx, is equal to or greater than the time threshold value δt. If it is determined to be equal to or greater than the time threshold value δt (Yes in Step S704), the process proceeds to Step S705, whereas the process proceeds to Step S706, if it is determined to be less than the time threshold value δt (No in Step S704).

At Step S705, the image transition time determination section 153 sets the defective pixel determination threshold value T being less than the initial setting value.

At Step S706, the image transition time determination section 153 sets the defective pixel determination threshold value T to the initial setting value.

At Step S707, the image transition detection unit 15 outputs the defective pixel determination threshold value T to the defective pixel correction unit 13, as the threshold value signal a15. Then, the process returns to Step S702.

Figure 7:
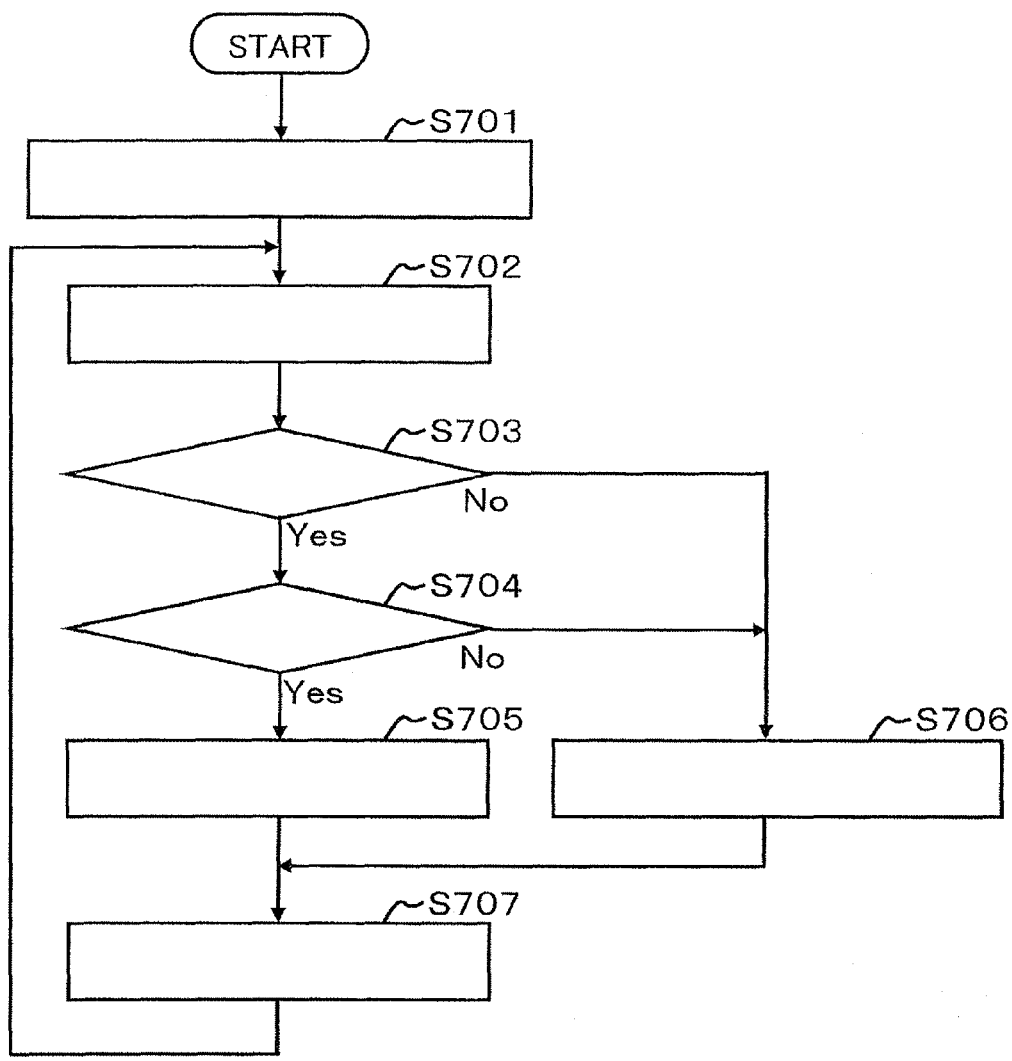
FIG. 7 depicts an example flowchart for setting a threshold value for a defective pixel determination.

Through the execution of the processing flow shown in FIG. 7, defective pixels can be detected more likely when the magnitude of the image transition is large, in the present embodiment, by setting the defective pixel determination threshold value T smaller than the initial setting value. Therefore, the defective pixels are screened so as not to cause degradation of image quality.

Note that objects containing high-frequency components are also detected more likely, by setting the defective pixel determination threshold value T smaller than the initial setting value, and afterimages occur due to the large magnitude of the image transition, where the afterimages are determined by the relationship between the shutter speed of the image processing apparatus 1 and the velocity of the image transition. As degradation of image quality becomes less likely to occur because of afterimage effects, the frequency for pixels to be determined as defective can be reduced, even if the defective pixel determination threshold value T becomes smaller than the initial setting value.

Here, an example of processing in case of afterimages will be described with reference to FIG. 8A-FIG. 8E.

Figure 8A:
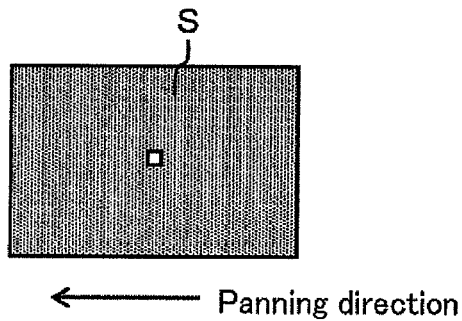
FIG. 8A through FIG. 8E are used for describing an example process in case of afterimages, where

FIG. 8A shows a status at photographing, where an object S, having a pixel in a white region and all the rest in a gray region, is to be photographed, by panning to the left, for example.

Figure 8B:
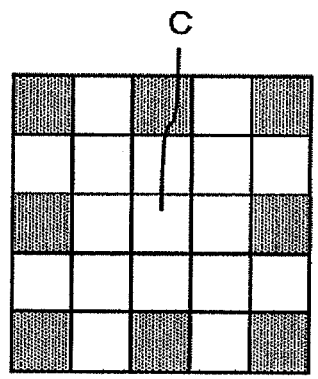
Figure 8C:
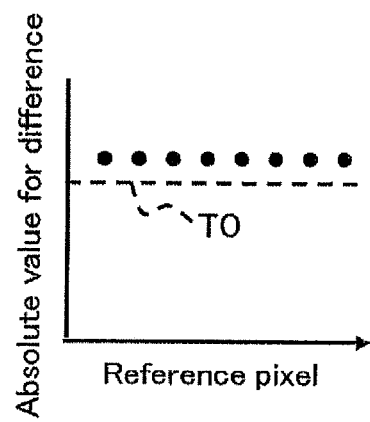

FIG. 8B represents a status of the pixel values without an afterimage, at a still photographing before panning, and FIG. 8C represents a relationship between the absolute value for the pixel value difference and the defective pixel determination threshold value T0. It is determined that the central pixel C is a defective pixel, because eight absolute values of the difference are all greater than the defective pixel determination threshold value T0.

Figure 8D:
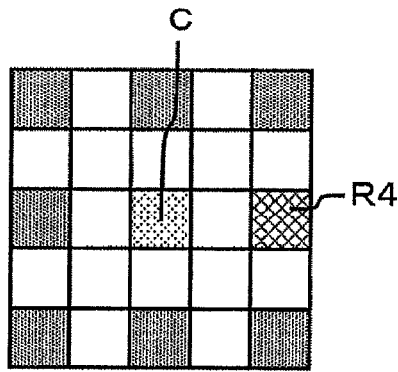
Figure 8E:
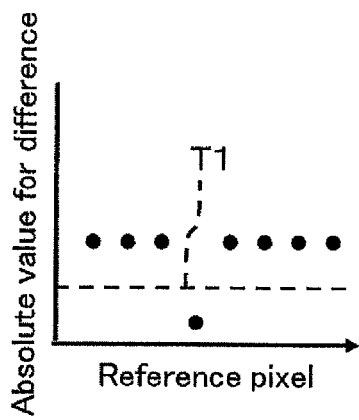

FIG. 8D represents a status of the pixel values having an afterimage, at the start of panning, and FIG. 8E represents a relationship between the absolute value for the pixel value difference and the defective pixel determination threshold value T1. The pixel values for the central pixel C and the reference pixel R4 become substantially similar, because of the influence from an afterimage. In this regard, assuming that the defective pixel determination threshold value T1 is set to be smaller than the defective pixel determination threshold value T0, the absolute value for the pixel value difference between the central pixel C and the reference pixel R4 is further smaller than the defective pixel determination threshold value T1. Therefore, as shown in FIG. 8E, it is determined that the central pixel C is not a defective pixel in case of an afterimage. This means that, when the magnitude of afterimages are large, a pixel becomes less likely to be determined as a defective pixel, even if the defective pixel determination threshold value T is set to be small, thus enabling to screen defective pixel so as not to cause degradation in image quality, as well as preventing an unnecessary correction process.

(Modified Example)

Here, an example configuration of an image processing apparatus 1a, as a variation of the image processing apparatus 1, will be described with reference to FIG. 9 (see FIGS. 1 and 5).

Figure 9:
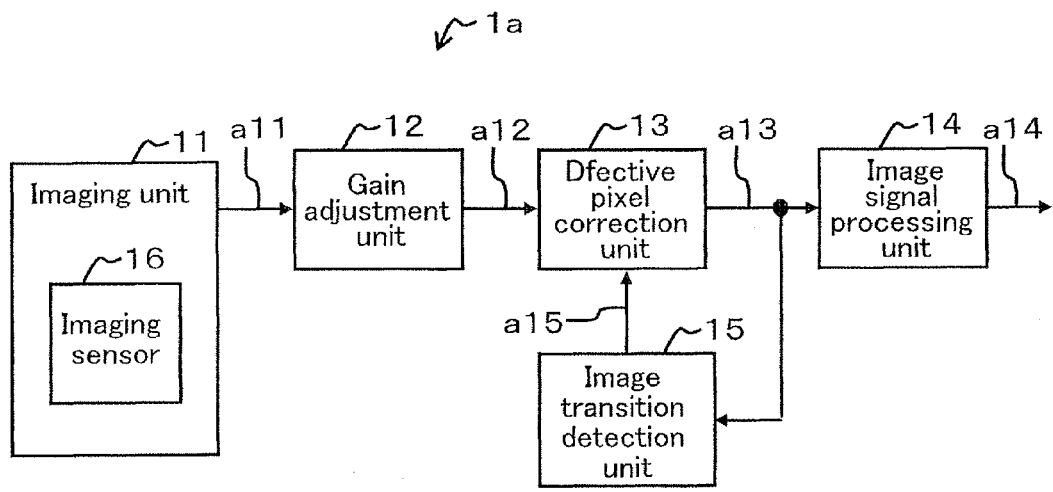
FIG. 9 depicts an example configuration of an image processing apparatus in a modified embodiment.

Difference of the configuration of the image processing apparatus 1a, shown in FIG. 9, from the configuration of the image processing apparatus 1, shown in FIG. 1, is that the signal inputted to the image transition detection unit 15 is the image correction signal a13 outputted from the defective pixel correction unit 13. The motion vector calculation section 151, in the image transition detection unit 15, calculates a motion vector between the previous image correction signal a13, that is stored in the storage, and the next image correction signal a13, that has just inputted.

(Monitoring System)

Figure 10:
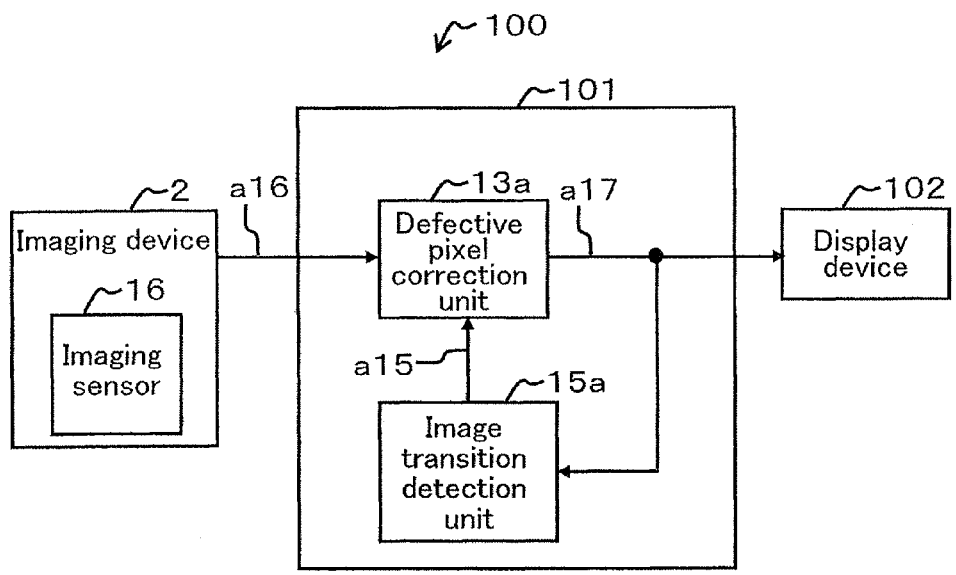
FIG. 10 depicts an example configuration of a monitoring system.

Next, an example configuration of a monitoring system 100 will be described using FIG. 10, where the monitoring system 100 realizes the functions of the defective pixel correction unit 13 and the pixel transition detection unit 15 described hereinabove, using an external monitoring device 101, without being built in the image processing apparatus 1 or 1a (see FIG. 1 as appropriate).

The monitoring system 100 is composed of an image processing apparatus 2, that is not provided with the functions of the defective pixel correction unit 13 and the image transition detection unit 15 described hereinabove, a monitoring device 101 and a display device 102.

The monitoring device 101 is, for example, a personal computer provided with a defective pixel correction unit 13a and an image transition detection unit 15a, each of which has a similar function as the defective pixel correction unit 13 and the image transition detection unit 15, respectively. An input to the defective pixel correction unit 13a is a video signal a16 outputted from the image processing apparatus 2.

The display device 102 has a function of displaying a display signal a17 outputted from the defective pixel correction unit 13a.

As the monitoring system 100 is provided with the defective pixel correction unit 13a and the image transition detection unit 15a, it is possible to control the defective pixel determination threshold value T according to the magnitude of the image transition. More specifically, as the monitoring system 100 sets the defective pixel determination threshold value T, in case of large magnitude of image transition, smaller than the defective pixel determination threshold value T0, in case of small magnitude of image transition, it is possible to screen defective pixels so as not to cause degradation in image quality. In addition, the monitoring system 100 can suppress an unnecessary correction process to correct defective pixels.

As described above, the image processing apparatuses 1, 1a and the monitoring system 100, in the present embodiment, can control the defective pixel determination threshold value T according to the magnitude of the image transition. More specifically, as the image processing apparatus 1 sets small value to the defective pixel determination threshold value T, in case of large magnitude of the image transition, and sets large value thereto, in case of small magnitude of the image transition, it is possible to screen defective pixels so as not to cause degradation in image quality. In addition, the image processing apparatuses 1, 1a and the monitoring system 100, can suppress an unnecessary correction process to correct defective pixels.

Note that it has been described as a condition in the present embodiment, for detecting an image transition, to satisfy that the velocity of the image transition is equal to or greater than the velocity threshold value δx and the duration of time (image transition time), for which the velocity stays equal to or greater than the velocity threshold value δx, is equal to or greater than the time threshold value δt. But the magnitude of the image transition may be determined by either one of the velocity of the image transition or the duration of time (image transition time).

In addition, a motion vector is used in the present embodiment when detecting an image transition, but it is not limited to this method and other methods may be applied to detect using one of the devices such as an acceleration sensor and an angular velocity sensor, or by the operation status of the image processing apparatus 1 (zooming, focus operation etc.).

What is claimed is:

1. An image processing apparatus comprising:
    an imaging unit having an imaging sensor that outputs an electrical signal by photoelectrically converting incident light from an object;
    an image transition detection unit that changes a correction criterion adopted for detecting a defective pixel on the imaging sensor, in response to a magnitude of an image transition of an image obtained through the imaging unit; and
    a defective pixel correction unit that detects a defective pixel on the imaging sensor based on a comparison between a pixel value of a pixel to be tested and the correction criterion, and then corrects the pixel value of the defective pixel;
    wherein the image transition detection unit sets the correction criterion with a defective pixel determination threshold value, and changes the defective pixel determination threshold value according to the magnitude of the image transition, and
    the defective pixel correction unit calculates a pixel value difference, for an image obtained via the image unit, between a subject pixel to be tested for a defect of the imaging sensor, and each of reference pixels other than the subject pixel, compares the difference with the defective pixel determination threshold value, determines that the subject pixel is a defective pixel when the difference is greater than the defective pixel determination threshold value, corrects the pixel value of the subject pixel, and generates an image correction signal.

2. The image processing apparatus according to claim 1, wherein the image transition detection unit changes the correction criterion so that the defective pixel on the imaging sensor is more likely detected, as the magnitude of the image transition becomes larger.

3. The image processing apparatus according to claim 1, wherein the image transition detection unit sets the defective pixel determination threshold value in case of the magnitude of the image transition being equal to or greater than a predetermined threshold value, to be smaller than the defective pixel determination threshold value in case of the magnitude of the image transition being less than the predetermined threshold value.

4. The image processing apparatus according to claim 1, wherein the image transition detection unit decreases the defective pixel determination threshold value, as the magnitude of the image transition becomes larger, when the magnitude of the image transition is equal to or greater than a predetermined threshold value.

5. An image processing apparatus comprising:
    an imaging unit having an imaging sensor that outputs an electrical signal by photoelectrically converting incident light from an object;
    an image transition detection unit that changes a correction criterion adopted for detecting a defective pixel on the imaging sensor, in response to a magnitude of an image transition of an image obtained through the imaging unit;
    a defective pixel correction unit that detects a defective pixel on the imaging sensor based on a comparison between a pixel value of a pixel to be tested and the correction criterion, and then corrects the pixel value of the defective pixel;
    a gain adjustment unit that controls the magnitude of a signal outputted from the imaging sensor; and
    an image signal processing unit,
    wherein the defective pixel correction unit obtains a signal outputted from the gain adjustment unit, corrects the pixel value of the defective pixel in the obtained signal, and generates an image correction signal,
    the image signal processing unit performs a predetermined processing, and generates a video signal, and
    the image transition detection unit calculates the magnitude of the image transition based on the transition selected from the group consisting of the image correction signal and the video signal, and changes the correction criterion according to the calculated magnitude of the image transition.

6. The image processing apparatus according to claim 1, wherein the image transition detection unit determines the magnitude of the image transition, based on either one or both of a velocity of the image transition and a duration time of the image transition.

7. The image processing apparatus according to claim 1, wherein the image transition detection unit calculates the magnitude of the image transition, based on at least one of a movement of a lens of the imaging unit, an operation status of panning and an operation status of tilting.

8. An image processing method for an image processing apparatus having an imaging unit that includes an imaging sensor for outputting an electrical signal by photoelectrically converting incident light from an object, and detecting defective pixels on the imaging sensor,
    the image processing method comprising:
    an image transition detection operation of changing a correction criterion used for detecting defective pixels on the imaging sensor, according to a magnitude of an image transition indicative of movement of an image obtained through the imaging unit; and
    an defective pixel correction operation of detecting defective pixels on the imaging sensor, based on a comparison between a pixel value of a pixel to be tested and the correction criterion, and correcting the pixel value of each of the defective pixels;
    wherein the image transition detection operation includes determining the magnitude of the image transition, based on either one or both of a velocity of the image transition and a duration time of the image transition.

9. The image processing method according to claim 8, wherein the image transition detection operation includes changing the correction criterion so that a defect of a subject pixel, to be tested for a defect of the imaging sensor, is more likely detected, as the magnitude of the image transition becomes relatively larger.

10. The image processing apparatus according to claim 6, wherein the image transition detection unit determines that the magnitude of the image transition is large when the velocity of the image transition is equal to or greater than the predetermined threshold value of velocity and the duration of time, while the velocity of the image transition is equal to or greater than the predetermined threshold value of velocity, is equal to or greater than the predetermined threshold value of time.

11. The image processing apparatus according to claim 6, wherein the image transition detection unit decreases the defective pixel determination threshold value, in case of large magnitude of after images that are determined based on the relationship between the velocity of the image transition and a shutter speed at photographing, in the video signal.

12. The image processing apparatus according to claim 1, wherein the image transition detection unit changes the correction criterion at every calculation of the magnitude of the image transition.

13. The image processing apparatus according to claim 1, wherein the image transition is more particularly an image-motion transition.

14. The image processing method according to claim 8, wherein the image transition is more particularly an image-motion transition.

* * * * *